(12) United States Patent
Ruth et al.

(10) Patent No.: US 9,726,091 B2
(45) Date of Patent: Aug. 8, 2017

(54) ACTIVE CONTROL OF ONE OR MORE EGR LOOPS

(71) Applicant: Cummins Inc., Columbus, IN (US)

(72) Inventors: Michael J. Ruth, Franklin, IN (US); Michael J. Cunningham, Greenwood, IN (US); Cary A. Henry, Helotes, TX (US)

(73) Assignee: Cummins Inc., Columbus, IN (US)

( * ) Notice: Subject to any disclaimer, the term of this patent is extended or adjusted under 35 U.S.C. 154(b) by 181 days.

(21) Appl. No.: 14/215,216

(22) Filed: Mar. 17, 2014

(65) Prior Publication Data

US 2014/0261350 A1 Sep. 18, 2014

Related U.S. Application Data

(60) Provisional application No. 61/793,358, filed on Mar. 15, 2013.

(51) Int. Cl.
| | |
|---|---|
| *F02D 41/00* | (2006.01) |
| *F02D 41/14* | (2006.01) |
| *F02M 26/05* | (2016.01) |
| *F02M 26/06* | (2016.01) |
| *F02M 26/24* | (2016.01) |
| *F02M 26/42* | (2016.01) |
| *F02M 26/28* | (2016.01) |

(52) U.S. Cl.
CPC ....... *F02D 41/005* (2013.01); *F02D 41/0052* (2013.01); *F02D 41/0065* (2013.01); *F02D 41/144* (2013.01); *F02D 41/146* (2013.01); *F02D 41/1454* (2013.01); *F02M 26/05* (2016.02); *F02M 26/06* (2016.02); *F02M 26/24* (2016.02); *F02M 26/42* (2016.02); *F02D 41/0007* (2013.01); *F02M 26/28* (2016.02); *Y02T 10/47* (2013.01)

(58) Field of Classification Search
CPC .............. F02D 41/005; F02D 41/0052; F02D 41/0065; F02D 41/144; F02D 41/1454; F02D 41/146; F02D 41/0007; F02D 41/021; F02M 25/0707; F02M 25/0709; F02M 25/0732; F02M 25/0731; F02M 26/05; F02M 26/06; F02M 26/24; F02M 26/28; F02M 26/42; Y02T 10/47; F01N 3/035; F01N 3/021
USPC ....... 123/703, 301, 568.21, 568.12; 701/108, 701/102
See application file for complete search history.

(56) References Cited

U.S. PATENT DOCUMENTS

| | | | |
|---|---|---|---|
| 6,857,263 B2* | 2/2005 | Gray, Jr. ................. | F01N 3/035 123/698 |
| 6,899,090 B2 | 5/2005 | Arnold | |
| 6,948,475 B1* | 9/2005 | Wong .................... | F02D 19/024 123/299 |
| 6,973,786 B1 | 12/2005 | Liu et al. | |

(Continued)

*Primary Examiner* — Thomas Moulis
*Assistant Examiner* — Susan Scharpf
(74) *Attorney, Agent, or Firm* — Taft Stettinius & Hollister LLP (57) ABSTRACT

Active control of one or more exhaust gas recirculation loops is provided to manage and EGR fraction in the charge flow to produce desired operating conditions and/or provide diagnostics in response to at least one of an oxygen concentration and a NOx concentration in the charge flow and in the exhaust flow.

18 Claims, 4 Drawing Sheets

(56) References Cited

U.S. PATENT DOCUMENTS

| | | | | |
|---|---|---|---|---|
| 7,047,741 B2 * | 5/2006 | Gray, Jr. | ............... | F01N 3/035 |
| | | | | 123/301 |
| 7,261,098 B2 * | 8/2007 | Vigild | ............... | F02D 41/0052 |
| | | | | 123/568.21 |
| 7,308,354 B2 * | 12/2007 | Daneau | ............... | F02D 41/005 |
| | | | | 123/674 |
| 7,367,188 B2 | 5/2008 | Barbe et al. | | |
| 7,493,762 B2 * | 2/2009 | Barbe | ............... | F02D 41/005 |
| | | | | 123/568.21 |
| 7,801,669 B2 * | 9/2010 | Nagae | ............... | F01N 3/021 |
| | | | | 123/559.1 |
| 7,836,693 B2 * | 11/2010 | Fujita | ............... | F02D 41/0052 |
| | | | | 123/568.11 |
| 8,001,953 B2 | 8/2011 | Murata et al. | | |
| 8,096,125 B2 * | 1/2012 | Hepburn | ............... | F01N 3/021 |
| | | | | 123/568.12 |
| 8,594,908 B2 * | 11/2013 | Yoshikawa | ......... | F02M 25/0722 |
| | | | | 123/568.17 |
| 2010/0199639 A1 * | 8/2010 | Matsunaga | ........... | F01N 3/0842 |
| | | | | 60/278 |
| 2011/0010079 A1 | 1/2011 | Shutty et al. | | |
| 2011/0054762 A1 * | 3/2011 | Nakayama | ........... | F02D 41/0072 |
| | | | | 701/108 |
| 2011/0094482 A1 * | 4/2011 | Weber | ............... | F02M 25/071 |
| | | | | 123/568.12 |
| 2013/0024086 A1 * | 1/2013 | Henry | ............... | F02D 41/021 |
| | | | | 701/102 |

\* cited by examiner

ACTIVE CONTROL OF ONE OR MORE EGR LOOPS

CROSS-REFERENCE TO RELATED APPLICATION

This application claims the benefit of the filing date of Provisional App. Ser. No. 61/793,358 filed on Mar. 15, 2013, which is incorporated herein by reference in its entirety.

GOVERNMENT RIGHTS

The present invention was made with Government assistance from the U.S. Department of Energy (DOE) under contract No. DE-EE0004125. The U.S. Federal Government may have certain rights therein.

BACKGROUND

The present application is generally related to control of one or more exhaust gas recirculation (EGR) loops. In order to meet the stringent emissions limits for light duty vehicles, engine out NOx emissions levels must be reduced substantially when compared with current single path high pressure EGR systems. Current single loop high pressure EGR systems are limited to their NOx reduction performance by high particular matter (PM) and hydrocarbon (HC) emissions, which increase exponentially as the EGR fraction increases. Dual path high pressure and low pressure EGR systems promise the capability of further reduced NOx emission levels, but at substantially lower HC and PM emissions. Due to the increased complexity of these systems, minor changes in component performance can have drastic impacts on the actual EGR fraction of the intake air. Therefore, further improvements in this technological area are needed.

SUMMARY

Active control of one or more EGR loops of an internal combustion engine system is provided. Other aspects include unique methods, techniques, systems, devices, kits, assemblies, equipment, and/or apparatus related to control of one or more EGR loops.

Further aspects, embodiments, forms, features, benefits, objects, and advantages shall become apparent from the detailed description and figures provided herewith.

DETAILED DESCRIPTION OF REPRESENTATIVE EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Feedback based control strategies are proposed herein to provide capabilities of meeting the desired exhaust gas recirculation ratios or fractions in the charge flow to produce a desire operating result. In certain aspects, systems and methods for feedback based control of single loop or multiple loop EGR systems are provided. Implementation of a multiple loop EGR system may be desirable in meeting low engine out NOx emissions levels while keeping PM and HC emissions to a minimum. Due to the complexity of multiple loop EGR systems, for example, open loop control (such as those based on look-up tables corresponding to various operating parameters) does not provide the level of controls sensitivity required for operation with fluctuating operating parameters. In one form, the control approaches described herein vastly improve the controls sensitivity, and are able to account for various fluctuations in operating parameters including cooler efficiency, flow restrictions, valve position, and other parameters.

Figure 1:
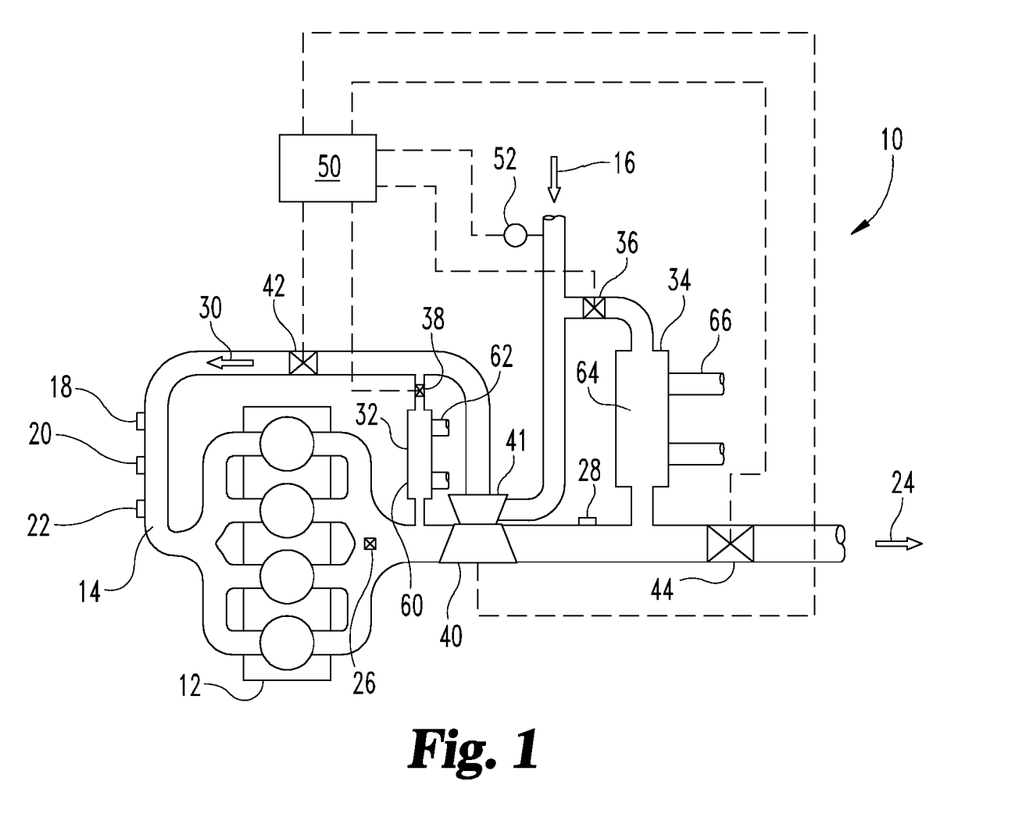
FIG. 1 is a schematic illustration of a system including an internal combustion engine and a dual loop high pressure and low pressure EGR system.

In one embodiment of a system 10 such as shown in FIG. 1, various sensors are inserted into the intake system 14 of the engine 12, and can record with a controller 50 a variety of parameters related to the incoming charge flow 30, which includes intake air flow 16 and any recirculated exhaust gas flow from one or both of high pressure EGR system 32 and low pressure EGR system 34. The monitored parameters may include oxygen concentration by an oxygen sensor 18, NOx concentration by a NOx sensor 20, temperature by a temperature sensor 22, and/or other parameters such as mass air flow of the charge air and intake manifold pressure, and parameters suitable for calculating the charge flow, such as with a speed-density approach. In addition, the parameters of the engine out exhaust gas 24 such as oxygen concentration from oxygen sensor 26 and NOx concentration from engine out NOx sensor 28 may also be monitored. The composition of the charge flow 30 including intake air flow 16 can then be compared with the composition of the engine out exhaust gas 24 in order to quantify the amount of exhaust gas 24 being re-circulated through the engine 12. The feedback based control system 10 can then be used to modify parameters such as a position of low pressure EGR valve 36, a position of high pressure EGR valve 38, a position or opening amount of a variable geometry (VG) turbine 40, a position of an intake air throttle 42, a position of an exhaust throttle 44, etc. in order to achieve a desired ratio of recirculated exhaust gas to the charge flow 30, i.e. the EGR fraction. Additionally, these controls can be used to blend both high pressure and low pressure EGR flows in order to achieve the desired EGR fractions in the charge flow 30.

Amongst other benefits, a feedback based control system 10 will provide improved EGR control when compared with an open loop look-up based system, and aging of the system will have a reduced impact on the ability of the system to meet requested EGR fraction.

In one form, the system 10 includes a dual path EGR system containing a low pressure loop 34 and a more traditional high pressure loop 32. In the high pressure loop 32, exhaust gas is removed from the flow of engine exhaust gas 24 upstream of the turbine 40, and is passed through a heat exchanger 60 (e.g. a cooler)cooled by an engine coolant supply line 62. This recirculated exhaust gas is then blended with compressed intake air flow 16 compressed by compressor 41, and is then combined with fuel in the engine 12 during the combustion process. In the low pressure EGR loop 34, exhaust gas is removed from the flow of exhaust gas 24 downstream of the turbine 40, and is passed through a heat exchanger 64 (e.g. a cooler) cooled by an engine coolant supply line 66. This recirculated exhaust gas is then blended with the intake air flow 16 upstream of the compressor 41. The blended feed is then compressed in the compressor 41, and is combined with fuel in the engine 12 during the combustion process. In one form, both the high pressure and low pressure EGR loops 32, 34 are equipped with variable position valves 38, 36, respectively, used to meter the amount of exhaust gas blended into the intake air flow 16.

In certain forms, in a single EGR path operation of system 10, the position of, for example, the high pressure EGR valve 38 position is commanded based on a look-up table as a function of engine operating parameters, and the high pressure EGR fraction is estimated based on the position from the look-up table. In the system illustrated in connection with FIG. 1, the oxygen and/or NOx concentration of the charge flow 30 in the intake is measured by sensors 18 and/or 20 and compared with the oxygen and/or NOx concentration of the exhaust gas measured by sensors 26 and/or 28 in order to quantify the actual EGR fraction in the charge flow. These measurements can then be used to modify the position(s) of high pressure valve 38 and/or low pressure EGR valve 36 in order to adjust an oxygen concentration in the charge flow to a desired oxygen concentration by achieving the desired EGR fraction based on engine operating conditions, thus resulting in closed loop control of EGR flow.

In an alternative embodiment where the total EGR flow is comprised both of a high pressure EGR fraction and a low pressure EGR fraction, one can utilize existing controls strategies as described above for estimating the high pressure EGR fraction from a look-up table based on valve position and engine operating parameters. The oxygen sensor 18 or NOx sensor 20 installed in the intake system 14 can then provide closed loop feedback control of the low pressure EGR valve 36 and thus the low pressure EGR fraction in order to control the total EGR fraction of the charge flow 30.

The system as shown in FIG. 1 also provides potential benefits for on-board diagnostics (OBD) capabilities of the EGR system. The EGR flow through one or both the high pressure and low pressure EGR loops 32, 34 can be estimated by monitoring various operating parameters of the EGR system including but not limited to temperature, pressure, etc., and determining an estimate of the EGR fraction from look up tables. By utilizing oxygen sensor 18 or NOx sensor 20 installed in the intake system 14, the total EGR fraction of the charge air flow can be directly calculated since the intake air flow is known from mass air flow sensor 52 and the oxygen concentration and NOx concentration in the fresh air of the intake flow is known. OBD can compare this calculated actual value of the total EGR fraction to the estimated EGR fraction based on indirect measurements and look up tables in order to check the EGR flow path for potential leaks.

The use of an oxygen sensor 18 and/or NOx sensor 20 in the intake system 14 also provides opportunities for periodic recalibration or correction of measurements of the mass air flow sensor 52. The EGR fraction in the intake system 14 can be measured by determining an oxygen concentration in intake system 14 and an oxygen concentration in the exhaust flow 24, and by assuming the oxygen amount in the inlet air is at atmospheric, one can calculate the EGR fraction in the charge flow 30. The rate of intake air flow 16 to the engine 12 is then calculated from the difference between the charge flow 30 through the intake system 14 and the determined EGR fraction. This calculation of intake air flow 16 can be used to correct the fresh air intake flow rate sensed by the mass air flow sensor 52 in order to account for sensor drift.

Figure 2:
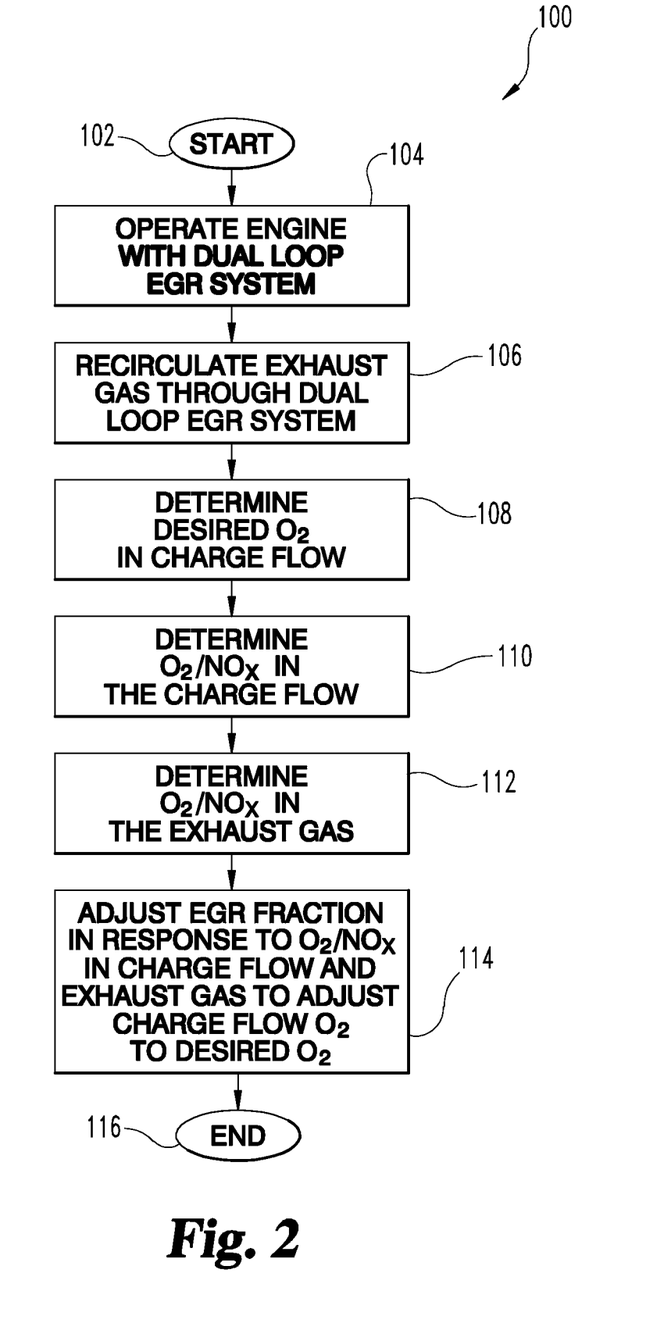
FIG. 2 is a flow diagram of one embodiment of a procedure for operating the engine and EGR system of FIG. 1.

Referring to FIG. 2, a flow diagram for one embodiment of a procedure 100 is illustrated. Procedure 100 starts at 102 in response to, for example, a key-on event. Procedure 100 includes an operation 104 to operate engine 12 with a dual loop EGR system, such as engine 12 including an intake system 14 with a compressor 41 and an exhaust system with a turbine 40, a high pressure EGR loop 32 connecting the exhaust system upstream of the turbine 40 to the intake system 14 downstream of the compressor 41, and a low pressure EGR loop 34 connecting the exhaust system downstream of the turbine 40 to the intake system 14 upstream of the compressor 41.

Procedure 100 further include an operation 106 to recirculate exhaust gas through the dual loop EGR system. For example, exhaust gas can be recirculated to the intake system 14 through both the high pressure EGR loop 32 and the low pressure EGR loop 34 to combine with the intake air flow 16 and provide charge flow 30 to an intake manifold of the engine that includes an EGR fraction. Procedure 100 further includes an operation 108 to determine a desired oxygen concentration in charge flow 30, an operation 110 to determine at least one of an oxygen concentration and a NOx concentration in the charge flow 30, and an operation 112 to determine at least one of an oxygen concentration and a NOx concentration in the exhaust gas 24.

Procedure 100 also includes an operation 114 to adjust the EGR fraction in response to the at least one of the oxygen concentration and the NOx concentration in the charge flow 30 and in the exhaust gas 24 to adjust an actual oxygen concentration in the charge flow 30 toward the desired oxygen concentration. Procedure 100 can return to operation 108, or end at 116 with a key-off event or other event indicating operating conditions are not suitable for procedure 100.

In one embodiment, procedure 100 includes adjusting the EGR fraction includes controlling a position of control valve 36. 38 in at least one of the low pressure EGR loop 34 and the high pressure EGR loop 32. In another embodiment, the procedure includes cooling recirculated exhaust gas with the heat exchanger 60 (e.g. a cooler) in the high pressure EGR loop 32 and the heat exchanger 64 (e.g. a cooler) in the low pressure EGR loop 34.

In another embodiment, procedure 100 includes determining the EGR fraction of the charge flow 30 in response to the at least one of the oxygen concentration and the NOx concentration in the charge flow 30, the at least one of the oxygen concentration and the engine out NOx concentration in the exhaust gas 24, and at least one of an oxygen concentration and a NOx concentration in the intake air flow 16, A portion of the EGR fraction from the high pressure EGR loop 32 can be estimated in response to a position of the high pressure EGR control valve 38 of the high pressure EGR loop 32 and engine operating parameters. A target EGR fraction can be determined and a position of the control valve 36 in the low pressure EGR loop 34 is controlled to adjust the EGR fraction toward the target EGR fraction.

In another embodiment, mass air flow sensor 52 in the intake system 14 is upstream of the connection with the low pressure EGR loop 32 and is operable to measure the intake air flow 16 in the intake system 14. In yet another embodiment, adjusting the EGR fraction includes operating at least one of intake throttle 42, exhaust throttle 44, and a variable geometry inlet to the turbine 40.

Figure 3:
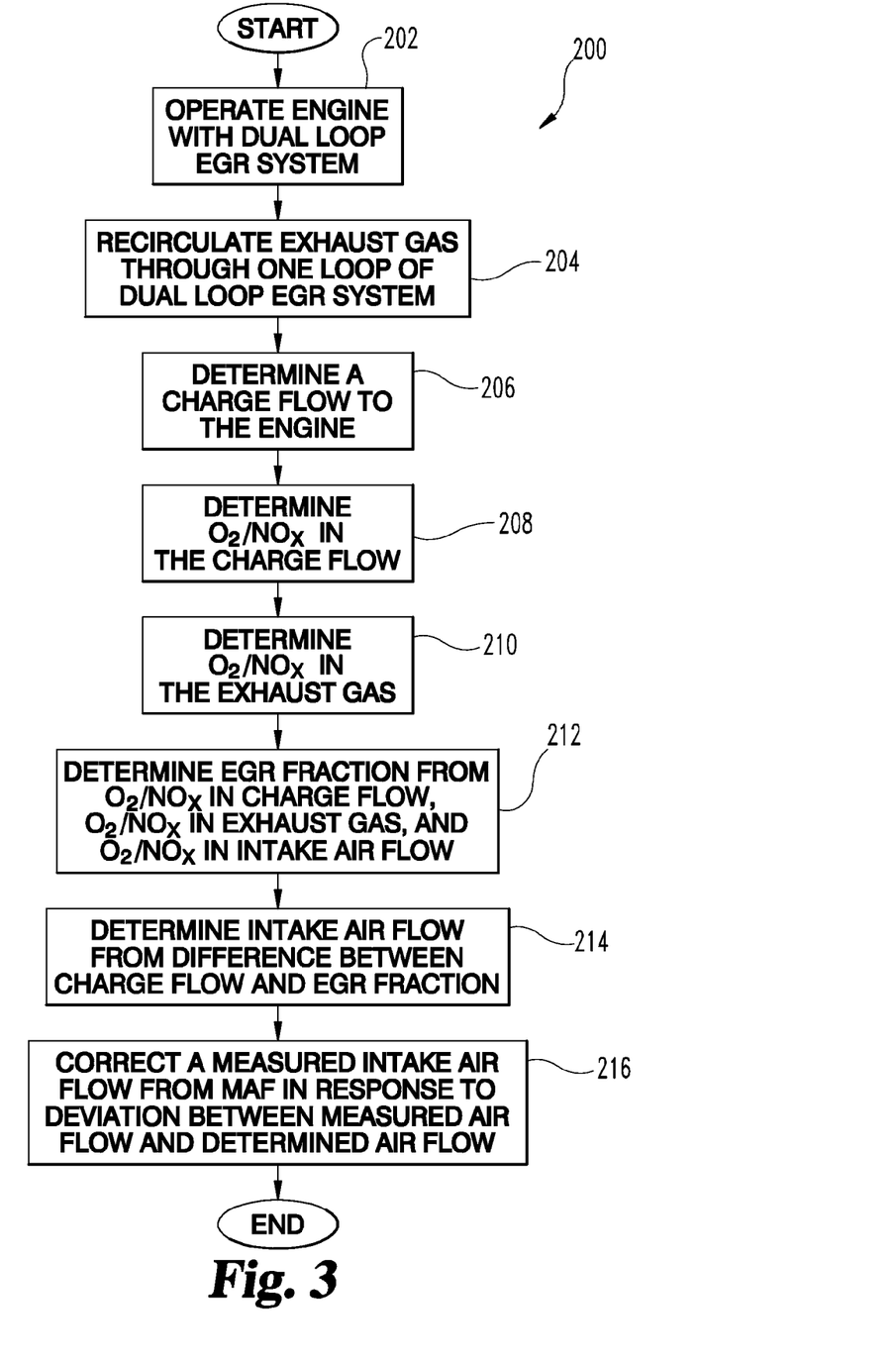
FIG. 3 is a flow diagram of another embodiment of a procedure for operating the engine and EGR system of FIG. 1.

Referring now to FIG. 3, a flow diagram of another embodiment procedure 200 is provided. After start, procedure 200 includes an operation 202 to operate engine 12 with a dual loop EGR system including high pressure EGR loop 32 and low pressure EGR loop 34. Procedure 200 continues at operation 204 to recirculate exhaust gas to the intake system through at least one of the high pressure EGR loop 32 and the low pressure EGR loop 34 to combine with an intake air flow and provide a charge flow to an intake manifold of engine 12. Procedure 200 continues at operation 206 to determine a charge flow 30 to the engine 12; at operation 208 to determine one of an oxygen concentration and a NOx concentration in the charge flow 30; and at operation 210 to determine one of an oxygen concentration and an engine out NOx concentration in the exhaust gas 24.

Procedure 200 continues at operation 212 to determine an EGR fraction of the charge flow 30 from the one of the oxygen concentration and the NOx concentration in the charge flow 30, the one of the oxygen concentration and engine out NOx concentration in the exhaust gas 24, and one of an oxygen concentration and a NOx concentration in the intake air flow 16. At operation 214 procedure 200 determines an intake air flow from the difference between the charge flow and the EGR fraction. Procedure 200 continues at operation 216 to correct an intake air flow measurement from mass air flow sensor 52 (MAF) in intake system 14 in response to a deviation of the intake air flow measurement from the intake air flow determined from the difference between the charge flow and the EGR fraction.

In one embodiment of procedure 200, exhaust gas is recirculated through both of the high pressure EGR loop 32 and the low pressure EGR loop 34.

Figure 4:
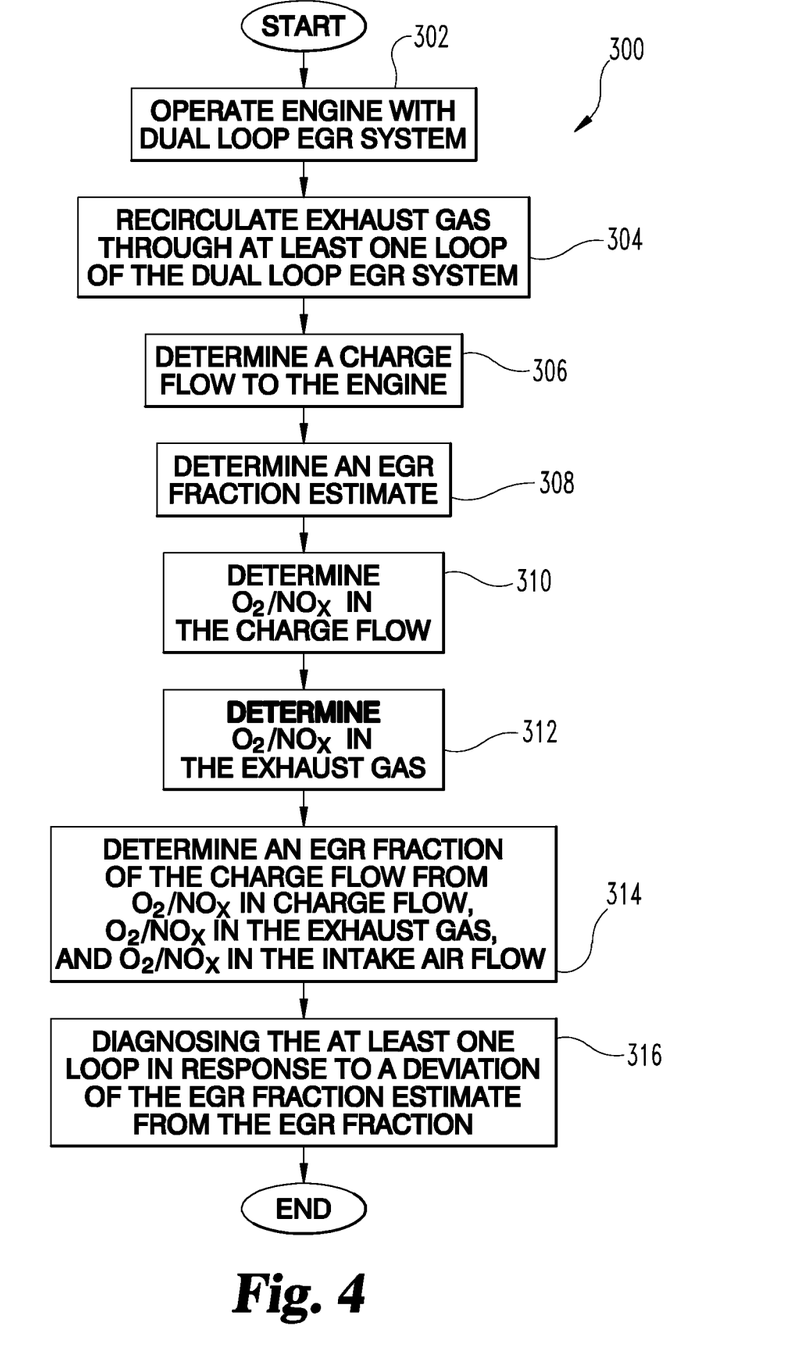
FIG. 4 is a flow diagram of another embodiment of a procedure for operating the engine and EGR system of FIG. 1.

Referring now to FIG. 4, a flow diagram of another embodiment procedure 300 is shown. After start, procedure 300 includes an operation 302 to operate engine 12 with a dual loop EGR system including high pressure EGR loop 32 and low pressure EGR loop 34. Procedure 300 continues at operation 304 to recirculate exhaust gas to the intake system through at least one of the high pressure EGR loop 32 and the low pressure EGR loop 34 to combine with an intake air flow and provide a charge flow to an intake manifold of engine 12. Procedure 300 continues at operation 306 to determine a charge flow 30 to the engine 12; at operation 308 to determine an EGR fraction estimate in the charge flow 30; at operation 310 to determine one of an oxygen concentration and an engine out NOx concentration in the charge flow 30; and at operation 312 to determine one of an oxygen concentration and an engine out NOx concentration in the exhaust gas 24.

Procedure 300 continues at operation 314 to determine an EGR fraction of the charge flow 30 from the one of the oxygen concentration and the NOx concentration in the charge flow 30, the one of the oxygen concentration and engine out NOx concentration in the exhaust gas 24, and one of an oxygen concentration and a NOx concentration in the intake air flow 16. At operation 316 procedure 300 includes diagnosing the at least one of the high pressure EGR loop and the low pressure EGR loop in response to a deviation of the EGR fraction estimate from the EGR fraction.

In an embodiment of any of procedures 100, 200, 300, determining one of the oxygen concentration and the NOx concentration in the charge flow includes measuring the oxygen concentration with a first oxygen sensor in the intake system downstream of the connection of the high pressure EGR loop with the intake system and determining one of the oxygen concentration and the engine out NOx concentration in the exhaust gas includes measuring the oxygen concentration with a second oxygen sensor in the exhaust system.

In another embodiment of any of procedures 100, 200, 300, determining one of the oxygen concentration and the NOx concentration in the charge flow includes measuring the NOx concentration with a first NOx sensor in the intake system downstream of the connection of the high pressure EGR loop with the intake system, and determining one of the oxygen concentration and the engine out NOx concentration in the exhaust gas includes measuring the engine out NOx concentration with a second NOx sensor in the exhaust system.

While the invention has been illustrated and described in detail in the drawings and foregoing description, the same is to be considered as illustrative and not restrictive in character, it being understood that only certain embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   operating an internal combustion engine including an intake system with a compressor and an exhaust system with a turbine, a high pressure exhaust gas recirculation (EGR) loop connecting the exhaust system upstream of the turbine to the intake system downstream of the compressor, and a low pressure EGR loop connecting the exhaust system downstream of the turbine to the intake system upstream of the compressor;
   recirculating exhaust gas to the intake system through both the high pressure EGR loop and the low pressure EGR loop to combine with an intake air flow and provide a charge flow to an intake manifold of the internal combustion engine that includes an EGR fraction indicative of a ratio of the recirculated exhaust gas to the charge flow;
   determining a desired oxygen concentration in the charge flow to the internal combustion engine;
   determining a NOx concentration in the charge flow;
   determining an engine out NOx concentration in the exhaust gas; and
   adjusting the EGR fraction in response to the NOx concentration in the charge flow and in the exhaust gas to adjust an actual oxygen concentration in the charge flow toward the desired oxygen concentration.

2. The method of claim 1, wherein adjusting the EGR fraction includes controlling a position of a control valve in at least one of the low pressure EGR loop and the high pressure EGR loop.

3. The method of claim 1, wherein at least one of the high pressure EGR loop and the low pressure EGR loop includes a heat exchanger for cooling recirculated exhaust gas passing therethrough.

4. The method of claim 1, further comprising determining the EGR fraction of the charge flow in response to at least one of an oxygen concentration and the NOx concentration in the charge flow, at least one of an oxygen concentration and the engine out NOx concentration in the exhaust gas, and at least one of an oxygen concentration and a NOx concentration in the intake air flow.

5. The method of claim 4, further comprising estimating a portion of the EGR fraction from the high pressure EGR loop in response to a position of a high pressure EGR control valve of the high pressure EGR loop and engine operating parameters.

6. The method of claim 5, further comprising determining a target EGR fraction and wherein adjusting the EGR fraction includes controlling a position of a control valve in the low pressure EGR loop to adjust the EGR fraction toward the target EGR fraction.

7. The method of claim 1, further comprising a mass air flow sensor in the intake system upstream of the connection with the low pressure EGR loop operable to measure the intake air flow in the intake system.

8. The method of claim 1, wherein:
determining at least one of an oxygen concentration and the NOx concentration in the charge flow includes measuring the oxygen concentration with a first oxygen sensor in the intake system downstream of the connection of the high pressure EGR loop with the intake system; and
determining at least one of an oxygen concentration and the engine out NOx concentration in the exhaust gas includes measuring the oxygen concentration with a second oxygen sensor in the exhaust system.

9. The method of claim 1, wherein:
determining the NOx concentration in the charge flow includes measuring the NOx concentration with a first NOx sensor in the intake system downstream of the connection of the high pressure EGR loop with the intake system; and
determining the engine out NOx concentration in the exhaust gas includes measuring the engine out NOx concentration with a second NOx sensor in the exhaust system.

10. The method of claim 1, wherein adjusting the EGR fraction includes operating at least one of an intake throttle in the intake system, an exhaust throttle in the exhaust system, and a variable geometry inlet to the turbine.

11. A method, comprising:
an internal combustion engine including an intake system with a compressor and an exhaust system with a turbine, a high pressure exhaust gas recirculation (EGR) loop connecting the exhaust system upstream of the turbine to the intake system downstream of the compressor, and a low pressure EGR loop connecting the exhaust system downstream of the turbine to the intake system upstream of the compressor;
recirculating exhaust gas to the intake system through at least one of the high pressure EGR loop and the low pressure EGR loop to combine with an intake air flow and provide a charge flow to an intake manifold of the internal combustion engine;
determining a charge flow to the internal combustion engine;
determining one of an oxygen concentration and a NOx concentration in the charge flow;
determining one of an oxygen concentration and an engine out NOx concentration in the exhaust gas;
determining an EGR fraction indicative of a ratio of the recirculated exhaust gas to the charge flow from the one of the oxygen concentration and the NOx concentration in the charge flow, the one of the oxygen concentration and engine out NOx concentration in the exhaust gas, and one of an oxygen concentration and a NOx concentration in the intake air flow;
determining an intake air flow from the difference between the charge flow and the EGR fraction; and
correcting an intake air flow measurement from a mass air flow sensor in the intake system in response to a deviation of the intake air flow measurement from the intake air flow determined from the difference between the charge flow and the EGR fraction.

12. The method of claim 11, wherein:
determining one of the oxygen concentration and the NOx concentration in the charge flow includes measuring the oxygen concentration with a first oxygen sensor in the intake system downstream of the connection of the high pressure EGR loop with the intake system; and
determining one of the oxygen concentration and the engine out NOx concentration in the exhaust gas includes measuring the oxygen concentration with a second oxygen sensor in the exhaust system.

13. The method of claim 11, wherein:
determining one of the oxygen concentration and the NOx concentration in the charge flow includes measuring the NOx concentration with a first NOx sensor in the intake system downstream of the connection of the high pressure EGR loop with the intake system; and
determining one of the oxygen concentration and the engine out NOx concentration in the exhaust gas includes measuring the engine out NOx concentration with a second NOx sensor in the exhaust system.

14. The method of claim 11, farther comprising recirculating exhaust gas through both of the high pressure EGR loop and the low pressure EGR loop.

15. A method, comprising:
operating an internal combustion engine including an intake system with a compressor and an exhaust system with a turbine, a high pressure exhaust gas recirculation (EGR) loop connecting the exhaust system upstream of the turbine to the intake system downstream of the compressor, and a low pressure EGR loop connecting the exhaust system downstream of the turbine to the intake system upstream of the compressor;
recirculating exhaust gas to the intake system through at least one of the high pressure EGR loop and the low pressure EGR loop to combine with an intake air flow and provide a charge flow to an intake manifold of the internal combustion engine;
determining a charge flow to the internal combustion engine;
determining an EGR fraction estimate of a ratio of the recirculate exhaust gas to the charge flow in response to a position of an EGR flow control valve in the at least one of the high pressure EGR loop and the low pressure EGR loop and engine operating parameters;

determining one of an oxygen concentration and a NOx concentration in the charge flow;

determining one of an oxygen concentration and an engine out NOx concentration in the exhaust gas;

determining an EGR fraction indicative of the ratio of the recirculated exhaust gas to the charge flow from the one of the oxygen concentration and the NOx concentration in the charge flow, the one of the oxygen concentration and engine out NOx concentration in the exhaust gas, and one of an oxygen concentration and a NOx concentration in the intake air flow;

providing a diagnostic of the at least one of the high pressure EGR loop and the low pressure EGR loop in response to a deviation of the EGR fraction estimate from the EGR fraction.

16. The method of claim 15, wherein:

determining one of the oxygen concentration and the NOx concentration in the charge flow includes measuring the oxygen concentration with a first oxygen sensor in the intake system downstream of the connection of the high pressure EGR loop with the intake system; and determining one of the oxygen concentration and the engine out NOx concentration in the exhaust gas includes measuring the oxygen concentration with a second oxygen sensor in the exhaust system.

17. The method of claim 15, wherein:

determining one of the oxygen concentration and the NOx concentration in the charge flow includes measuring the NOx concentration with a first NOx sensor in the intake system downstream of the connection of the high pressure EGR loop with the intake system; and determining one of the oxygen concentration and the engine out NOx concentration in the exhaust gas includes measuring the engine out NOx concentration with a second NOx sensor in the exhaust system.

18. The method of claim 15, further comprising recirculating exhaust gas through both of the high pressure EGR loop and the low pressure EGR loop.

* * * * *